United States Patent
Park et al.

(10) Patent No.: US 7,910,251 B2
(45) Date of Patent: Mar. 22, 2011

(54) FUEL CELL SYSTEM

(75) Inventors: Myung-Seok Park, Gyeongsangnam-Do (KR); Hong Choi, Gyeongsangnam-Do (KR); Kyu-Jung Kim, Gyeonggi-Do (KR); Myeong-Ho Lee, Busan (KR); Cheol-Hwan Kim, Gyeongsangnam-Do (KR); Yong-Jun Hwang, Gyeongsangnam-Do (KR); Seung-Tae Ko, Daegu (KR); Seong-Geun Heo, Busan (KR); Tae-Hee Cho, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 1092 days.

(21) Appl. No.: 11/572,539

(22) PCT Filed: Aug. 17, 2004

(86) PCT No.: PCT/KR2004/002056
§ 371 (c)(1),
(2), (4) Date: Jan. 23, 2007

(87) PCT Pub. No.: WO2006/019197
PCT Pub. Date: Feb. 23, 2006

(65) Prior Publication Data
US 2008/0003463 A1    Jan. 3, 2008

(51) Int. Cl.
*H01M 8/04* (2006.01)
(52) U.S. Cl. ......... 429/415; 429/449; 429/505; 429/513
(58) Field of Classification Search ............. 429/17, 429/22, 23, 32, 415, 449, 505, 515
See application file for complete search history.

(56) References Cited

U.S. PATENT DOCUMENTS

| | | | |
|---|---|---|---|
| 3,511,710 A | | 5/1970 | Jung et al. |
| 4,810,597 A | * | 3/1989 | Kumagai et al. ............... 429/22 |
| 6,001,499 A | | 12/1999 | Grot et al. |
| 6,350,423 B1 | | 2/2002 | Aoyama |

(Continued)

FOREIGN PATENT DOCUMENTS

CN    1567627    1/2005

(Continued)

OTHER PUBLICATIONS

English language Abstract of KR 10-2004-0003658.

(Continued)

*Primary Examiner* — Stephen J. Kalafut
(74) *Attorney, Agent, or Firm* — KED & Associates, LLP

(57) ABSTRACT

A fuel cell system comprises: a fuel cell stack (100) where an anode (110) and a cathode (120) are arranged under a state that an electrolyte membrane is positioned therebetween; a fuel tank (300) for storing a fuel; a fuel circulation supply means (400) for circulation-supplying a fuel stored in the fuel tank (300) to the anode of the fuel cell stack; an air supply unit (200) connected to the cathode of the fuel cell stack (100) by an air supply line, for supplying oxygen, etc. to the cathode (120); a sensing unit (500) for measuring a concentration of at least one of fuels supplied to the anode (110) and a control unit for receiving a signal of the sensing unit (500) and informing replacement time of a fuel. According to this, a fuel usage is maximized by informing replacement time of a used fuel and a filter (450) for filtering impurity by detecting a fuel consumption degree and an impurity generation amount.

28 Claims, 3 Drawing Sheets

U.S. PATENT DOCUMENTS

| | | | |
|---|---|---|---|
| 6,830,841 B2 * | 12/2004 | Saito | 429/22 X |
| 6,991,865 B2 * | 1/2006 | Acker et al. | 429/22 |
| 7,470,478 B2 * | 12/2008 | Surampudi et al. | 429/17 X |
| 7,479,342 B2 * | 1/2009 | Hasegawa et al. | 429/22 X |
| 7,563,530 B2 * | 7/2009 | Kim et al. | 429/22 X |
| 2003/0143443 A1 | 7/2003 | Tsang et al. | |
| 2003/0190504 A1 | 10/2003 | Fisher et al. | |
| 2003/0235748 A1 | 12/2003 | Haltiner, Jr. et al. | |
| 2007/0048570 A1 | 3/2007 | Ko et al. | |
| 2007/0048581 A1 | 3/2007 | Hwang et al. | |
| 2007/0054161 A1 | 3/2007 | Hwang et al. | |

FOREIGN PATENT DOCUMENTS

| | | |
|---|---|---|
| EP | 1038832 | 9/2000 |
| JP | 49-7699 | 2/1974 |
| KR | 10-2004-0003658 | 1/2004 |
| RU | 2186019 | 7/2002 |

OTHER PUBLICATIONS

U.S. Appl. No. 11/538,171 to Ryoo et al., which was filed Oct. 3, 2006.

U.S. Appl. No. 11/548,773 to Park et al., which was filed Oct. 12, 2006.

U.S. Appl. No. 11/572,529 to Park et al., which was filed Jan. 23, 2007.

U.S. Appl. No. 11/469,644 to Hwang et al., which was filed Sep. 1, 2006.

U.S. Appl. No. 11/572,545 to Park et al., which was filed Jan. 23, 2007.

English language Abstract of CN 1567627.

English language Abstract of RU 2186019.

* cited by examiner

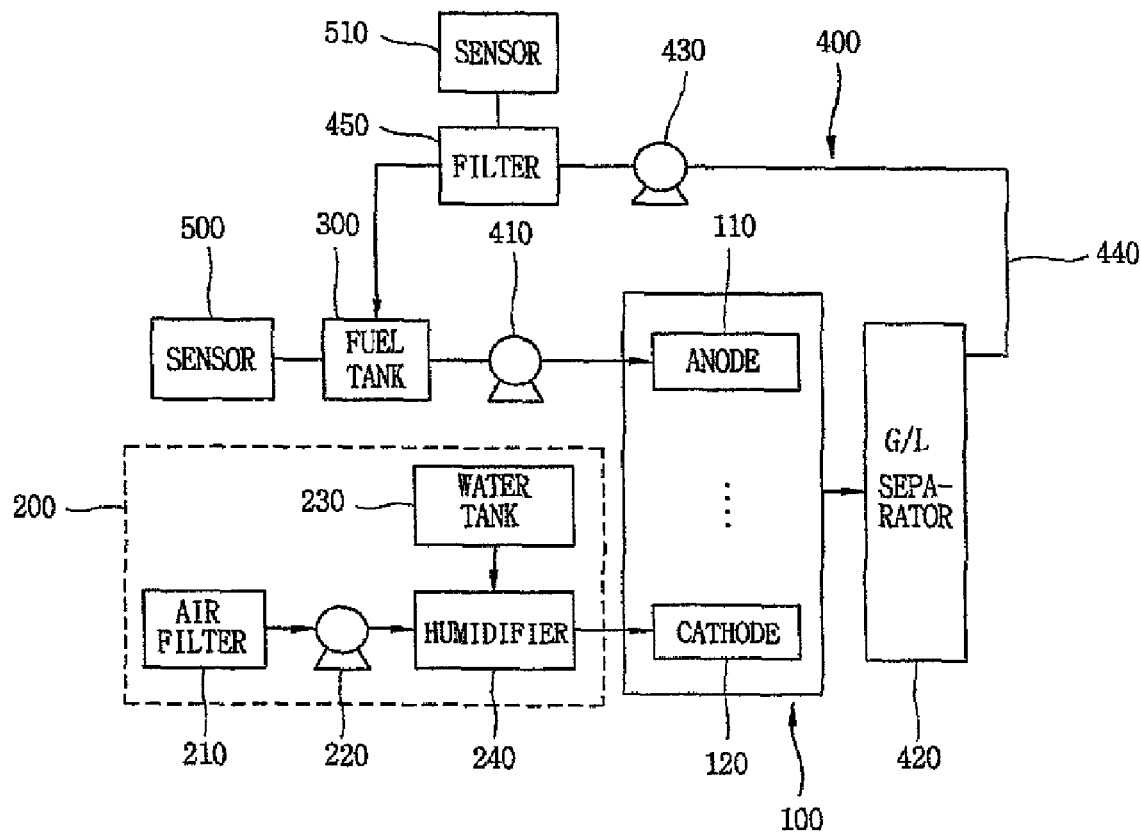
[Fig. 3]
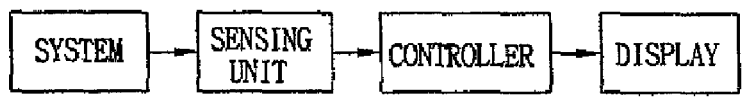
[Fig. 4]
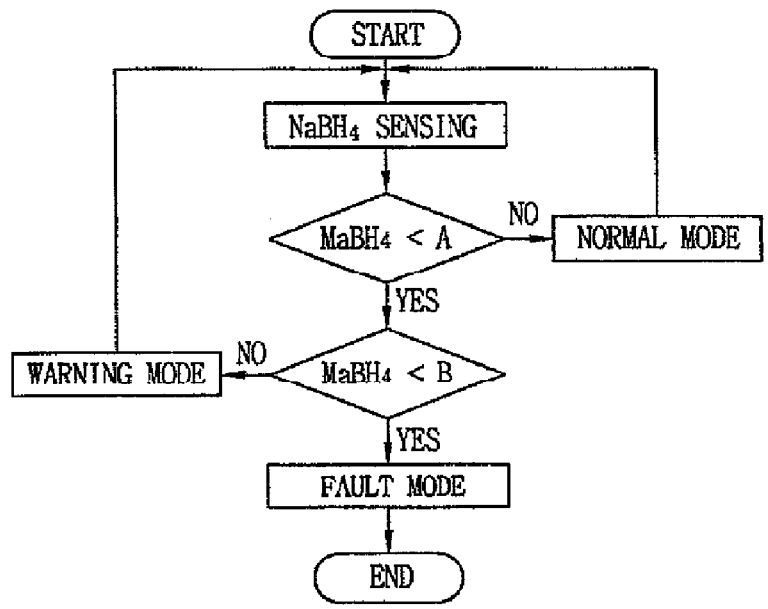
[Fig. 5]

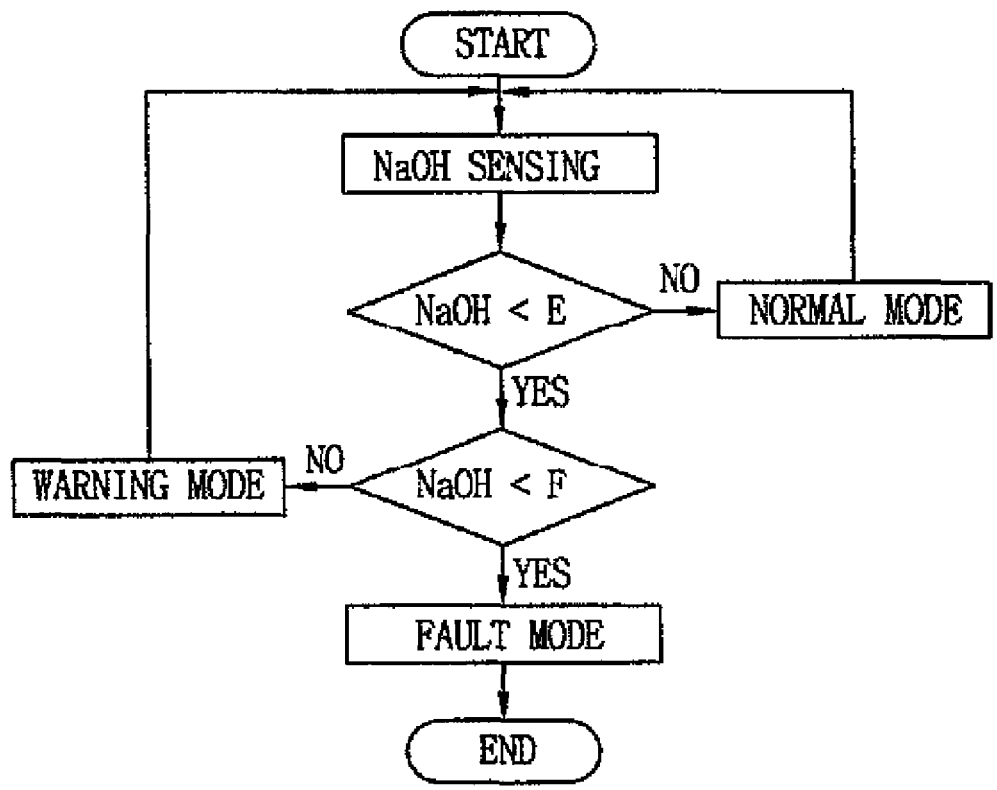
[Fig. 6]
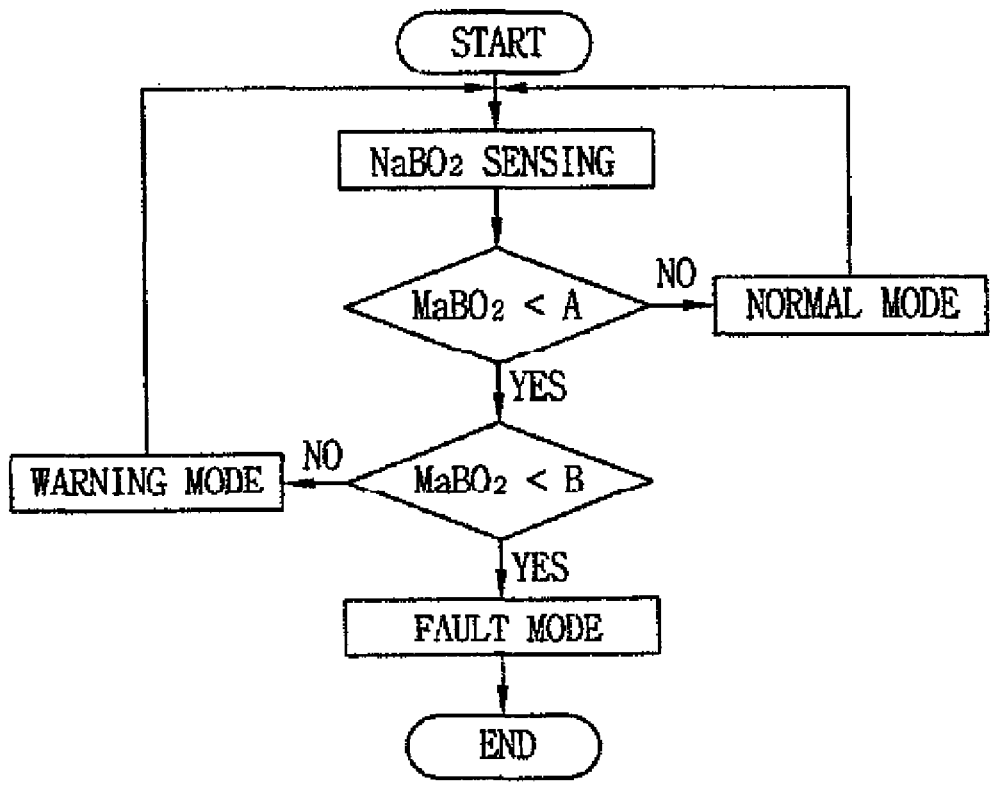
[Fig. 7]

FUEL CELL SYSTEM

TECHNICAL FIELD

The present invention relates to a fuel cell system, and more particularly, to a fuel cell system for informing replacement time of a fuel used at a fuel cell and a filter for filtering impurities, and a controlling method thereof.

BACKGROUND ART

A fuel cell is being developed as a replacement of a fossil fuel that is not eco-friendly. Differently from a general secondary cell, the fuel cell is for directly converting an energy difference between before and after a reaction generated as hydrogen and oxygen are electrochemically reacted into electric energy without a fuel combustion (oxidation reaction) by supplying a fuel (hydrogen or hydrocarbon) to an anode and supplying oxygen to a cathode.

The conventional fuel cell system, as shown in FIG. 1, comprises: a fuel cell stack 10 where a plurality of anodes 11 and cathodes 12 are stacked under a state that an electrolyte membrane (not shown) are disposed therebetween for generating electric energy by an electrochemical reaction of hydrogen and oxygen; a fuel tank 30 for storing a fuel for a hydrogen decomposition in order to supply to the anode 11; an air supply portion 20 for oxygen-including air to the cathode 12; and a conduit 40 for connecting each component of the fuel cell system.

A fuel pump 31 for pumping a fuel stored in the fuel tank 30 is installed between the fuel tank 30 and the anode 11 of the fuel cell stack 10.

The air supply portion 20 includes: an air compressor 22 for supplying air in the atmosphere to the cathode 12 the fuel cell stack 10; an air filter 21 for filtering air supplied to the fuel cell stack 10; and a humidifier 24 for humidifying air supplied to the fuel cell stack 10. The humidifier 24 is provided with a water tank 23 for supplying moisture thereto.

As a fuel of the fuel cell system, $KBH_4$, $NaBH_4$, etc. for decomposing hydrogen are used. In case that $NaBH_4$ is used as a fuel, NaOH or KOH, electrolyte aqueous solution is added thereto. An unexplained reference numeral 50 denotes a load.

A process for generating electric energy by supplying a fuel to the conventional fuel cell will be explained as follows.

As the fuel pump 31 is driven according to a control signal of a control unit (not shown), a fuel stored in the fuel tank 30 is pumped thereby to be supplied to the anode 11 of the fuel cell stack 10. As the air compressor 22 is operated, air filtered by the air filter 21 is humidified by passing through the humidifier 24 thus to be supplied to the cathode 12 of the fuel cell stack 10.

When a fuel and air are supplied to the fuel cell stack 10, an electrochemical oxidation of hydrogen is performed in the anode 11 and an electrochemical de-oxidation of oxygen is performed in the cathode 12 under a state the electrolyte membrane (not shown) is positioned therebetween. Herein, a generated electron is moved thus to generate electricity. The generated electricity is supplied to the load 50.

In case that a fuel is NaBH and NaOH of electrolyte aqueous solution, a reaction performed in the anode is expressed a following chemical formula.

$$2H_2O + NaBH_4 \rightarrow NaBO_2 + 4H_2$$

After a reaction, impurity such as NaBO shown in the above formula is necessarily generated The impurity exists as an aqueous solution state and is solidified at a conduit, or the impurity is precipitated in the fuel tank thus to prevent a flow of a fuel. Therefore, it is necessary to replace a fuel or to remove impurity before impurity is excessively generated.

Replacement time of the fuel tank has to be determined by checking a consumption amount of a fuel. When a fuel is replaced in advance, an excessive amount of fuel remains in the fuel tank thus to cause a fuel waste. Also, when a fuel is replaced too late, the fuel is completely consumed thus to cause a problem that the system is shut-down.

In the conventional art, replacement time of a fuel was determined by referring to a driving time of the system or an accumulated consumption power used in the load. However, since a consumption amount of a fuel and a generation amount of impurity are different according to a driving condition such as a load size, temperature, humidity, etc., it was impossible to check a precise replacement time of the fuel tank.

DISCLOSURE

Therefore, it is an object of the present invention to provide a fuel cell system capable of maximizing a fuel usage by informing replacement time of a used fuel and a filter for filtering impurity by detecting a fuel consumption degree and an impurity generation amount.

To achieve these objects, there is provided a fuel cell system comprising: a fuel cell stack where an anode and a cathode are arranged under a state that an electrolyte membrane is positioned therebetween; a fuel tank for storing a fuel; a fuel circulation supply means for circulation-supplying a fuel stored in the fuel tank to the anode of the fuel cell stack; an air supply unit connected to the cathode of the fuel cell stack by an air supply line, for supplying oxygen, etc. to the cathode; a sensing unit for measuring a concentration of at least one of fuels supplied to the anode; and a control unit for receiving a signal of the sensing unit and informing replacement time of a fuel.

The fuel cell system comprises: a DBFC for generating a power by receiving $NaBH_4$, NaOH, etc.; a sensing unit arranged at the DBFC, for measuring a concentration of at least one of $NaBH_4$, NaOH that are used as a fuel, or $NaBO_2$ that is a product after a reaction; and a control unit for informing replacement time of a fuel or a $NaBO_2$ filter by receiving a signal of the sensing unit.

To achieve these objects, there is also provided a controlling method of a fuel cell system comprising: a first step of measuring a concentration of at least one fuel; a second step of comparing a value measured in the first step with a preset value; and a third step of informing replacement time of a fuel according to a result obtained in the second step.

The controlling method of a fuel cell system comprises: a first step of measuring a concentration of at least one of NaOH, $NaBH_4$ that are used as a fuel, and $NaBO_2$ that is a byproduct; a second step of comparing a value measured in the first step with a preset value; and a third step of informing input time of a fuel or replacement time of a filter according to a comparison result obtained in the second step.

DESCRIPTION OF DRAWINGS

FIG. 3 is a construction view of a fuel cell system according to a second embodiment of the present invention;

FIG. 4 is a flow chart showing a signal transmission order of the fuel cell system according to the present invention;

FIG. 5 is a flow chart of a controlling method of the fuel cell system for checking replacement time of a fuel according to NaBH in accordance with the present invention;

FIG. 6 is a flow chart of the controlling method of the fuel cell system for checking replacement time of a fuel according to NaOH in accordance with the present invention; and FIG. 7 is a flow chart of the controlling method of the fuel cell system for checking replacement time of a fuel according to $NaBO_2$ in accordance with the present invention.

BEST MODE

Hereinafter, a fuel cell system according to the present invention will be explained with reference to the attached drawings.

First, a first embodiment of the present invention will be explained.

Figure 1:
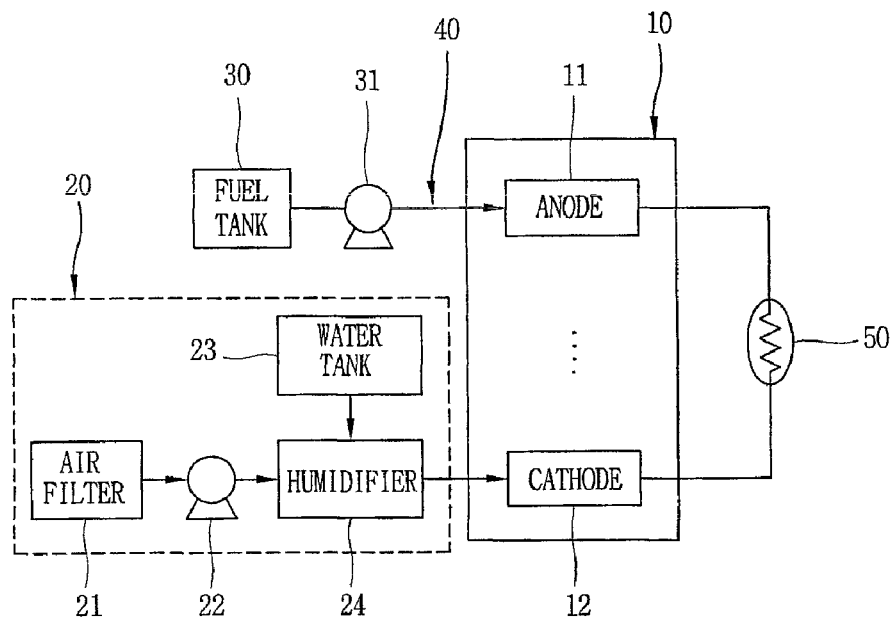
FIG. 1 is a construction view showing a fuel cell system in accordance with the conventional art.
Figure 2:
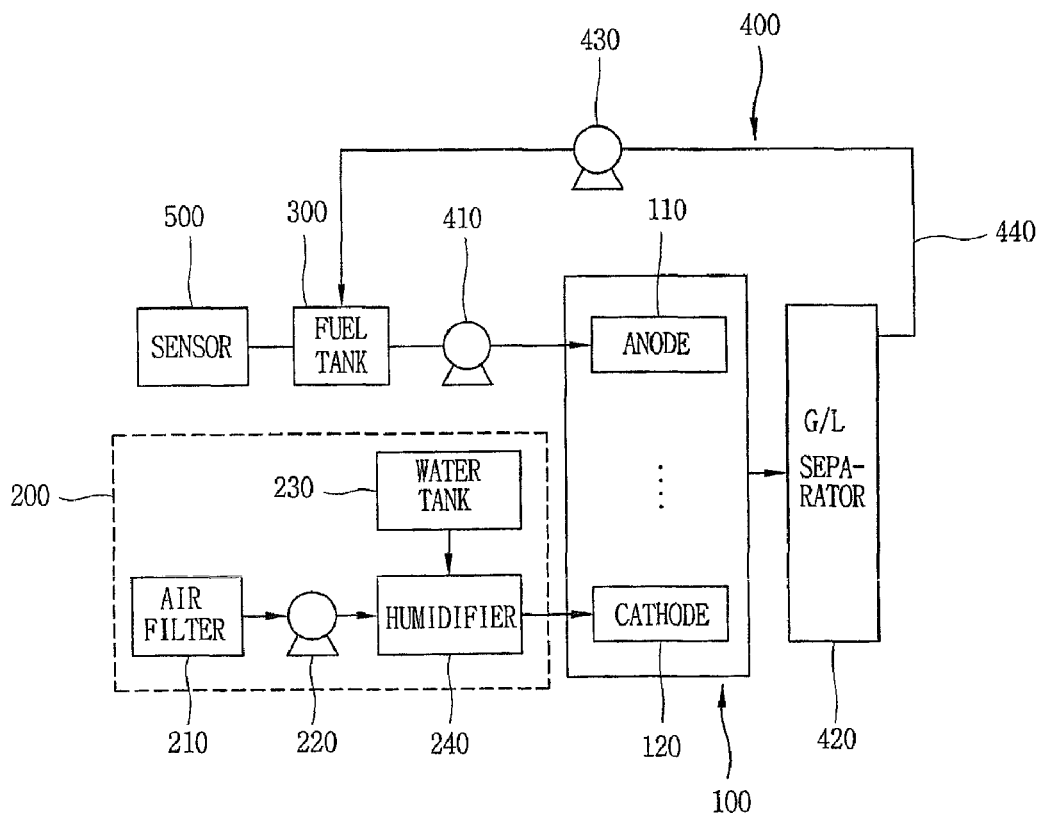
FIG. 2 is a construction view of a fuel cell system according to a first embodiment of the present invention.

FIG. 2 is a construction view of a fuel cell system according to a first embodiment of the present invention.

As shown, the fuel cell system according to the present invention comprises: a fuel cell stack 100 where an anode 110 and a cathode 120 are arranged under a state that an electrolyte membrane is positioned therebetween; a fuel tank 300 for storing a fuel; a fuel circulation supply means 400 for circulation-supplying a fuel stored in the fuel tank 300 to the anode 110 of the fuel cell stack 100; an air supply unit 200 connected to the cathode 120 of the fuel cell stack 100 by an air supply line, for supplying oxygen, etc. to the cathode 120; a sensing unit 500 for measuring a concentration of at least one of fuels supplied to the anode 110; and a control unit (not shown) for receiving a signal of the sensing unit 500 and informing replacement time of a fuel.

The fuel tank 300 can be replaced when a stored fuel is consumed, or a fuel can be refilled in the fuel tank 300.

As a fuel supplied to the fuel tank 300, one of $NaBH_4$, $KBH_4$, $LiAlH_4$, $KH$, $NaH$, etc. and one of electrolyte aqueous solution such as NaOH, KOH, etc. can be used. The electrolyte aqueous solution can be stored in an additional container thus to be supplied to the anode 110 of the fuel cell stack 100 after being mixed with $NaBH_4$, $KBH_4$, etc.

In the preferred embodiment of the present invention, $NaBH_4$ and electrolyte aqueous solution, NaOH were used. Said $NaBH_4$ is supplied to the fuel tank 300 as a powder state at the ordinary temperature, and the electrolyte aqueous solution NaOH is stored in an additional container thus to reduce a weight of the fuel tank. Since the NaOH having a strong corrosion characteristic is stored in the additional container formed with a material of a strong corrosion-resistance characteristic differently from the fuel tank 300, a danger inflicted to a human body and an environmental pollution due to the NaOH can be prevented.

The fuel circulation supply means 400 includes: a pump 410 arranged between the fuel tank 300 and the fuel cell stack 100, for pumping a fuel; a gas/liquid separator 420 for separating a fuel, air, and a byproduct remaining at the fuel cell stack after a reaction into gas and liquid; a fuel returning line 440 for returning liquid separated by the gas/liquid separator 420 to the fuel tank 300; and a recycle pump 430 arranged on the fuel returning line 440, for pumping liquid separated by the gas/liquid separator 420.

The air supply unit 200 includes: an air compressor 220 for supplying air in the atmosphere to the cathode 120 of the fuel cell stack 100; and an air filter 210 for filtering air supplied to the fuel cell stack 100.

The air supply unit 200 preferably includes: a humidifier 240 for humidifying air supplied to the fuel cell stack 100; and a water tank 230 for supplying moisture to the humidifier 240.

As the sensing unit, a concentration sensor for measuring a concentration of at least one of $NaBH_4$ and NaOH is used The sensing unit can be arranged on a line of the fuel circulation supply means 400.

FIG. 3 is a construction view of a fuel cell system according to a second embodiment of the present invention.

The fuel supply means 400 further includes a filter 450 for filtering a byproduct generated after a reaction.

In case that $NaBH_4$ and electrolyte aqueous solution NaOH are used as a fuel, the filter 450 is constructed as a $NaBO_2$ filter for filtering $NaBO_2$.

$NaBO_2$ generated at the fuel cell stack 100 after a reaction is re-crystallized as the temperature is lowered. The re-crystallized solid $NaBO_2$ prevents a fuel flow at the fuel returning line 440 of the fuel circulation supply means 400 or at the fuel tank 300. Therefore, it is preferable to remove the re-crystallized solid $NaBO_2$.

In case that the filter 450 for filtering $NaBO_2$ is provided, $NaBO_2$ is filtered by the filter 450 thereby not to be re-crystallized in the fuel tank 300. According to this, the fuel tank 300 is not required to be replaced, but only the filter 450 can be replaced.

In said case, a second sensing unit for measuring an amount of $NaBO_2$, a byproduct after a reaction is further included. The second sensing unit can be arranged at the fuel tank 300 or at the fuel circulation supply means 400.

FIG. 4 is a flow chart showing a signal transmission order of the fuel cell system according to the present invention.

A concentration of at least one fuel is measured by the sensing unit mounted at the fuel tank or at the fuel circulation supply means, and then the measured concentration value is transmitted to the control unit thus to be compared with a preset value. According to the comparison result, replacement time of a fuel or a filter is displayed. The display is performed by notifying the replacement time to the user as a character message, by lighting a red LED visually, or by generating a warning sound auditorily.

A controlling method of the fuel cell system according to the present invention is as follows.

The controlling method of the fuel cell system comprises: a first step of measuring a concentration of at least one fuel; a second step of comparing a value measured in the first step with a preset value; and a third step of informing replacement time of a fuel according to a result obtained in the second step.

In the first step, a concentration of at least one of $NaBH_4$, a fuel and NaOH, electrolyte aqueous solution is measured.

FIG. 5 is a flow chart of the controlling method of the fuel cell system for checking replacement time of a fuel according to $NaBH_4$ in accordance with the present invention. In the third step, when a measured concentration of $NaBH_4$ is more than or the same as a preset value A, it is judged as a normal mode and a concentration of the $NaBH_4$ is again measured after a certain time. Said normal mode is for informing that a normal driving is being performed, and is a mode in which the fuel cell system is normally operated.

When a measured concentration of $NaBH_4$ is less than the preset value A, the measured concentration is again compared with a preset value B that is less than A. If the concentration of $NaBH_4$ is less than A and more than or the same as B, it is judged as a warning mode and a concentration of the $NaBH_4$ is again measured after a certain time. Said warning mode is for informing that $NaBH_4$ has to be complemented due to a deficient fuel, and is a mode in which the fuel cell system is normally operated.

If the concentration of $NaBH_4$ is less than the preset value B, it is judged as a fault mode. Said fault mode is for informing that the fuel cell system is to be stopped, and is a mode in which the fuel cell system is stopped.

FIG. 6 is a flow chart of the controlling method of the fuel cell system for checking replacement time of a fuel according to NaOH in accordance with the present invention. The method for checking replacement time of a fuel according to NaOH is similar to the method for checking replacement time of a fuel according to $NaOH_4$.

In case that the fuel circulation supply means 400 further includes the filter 450 for filtering a byproduct generated after a reaction like in the second embodiment shown in FIG. 3, the controlling method of the fuel cell system is as follows.

FIG. 7 is a flow chart of the controlling method of the fuel cell system for checking replacement time of a fuel according to $NaBO_2$ in accordance with to the present invention.

The first step further includes a step of measuring an amount of $NaBO_2$.

The method for checking replacement time of a fuel according to $NaBO_2$ is similar to the method for checking replacement time of a fuel according to $NaOH_4$. However, in the third step, when a concentration of $NaBO_2$ is less than or the same as a preset value E, it is judged as a normal mode since the $NaBO_2$ is a byproduct generated after a reaction. Also, if a concentration of $NaBO_2$ is more than E and less than or the same as F that is more than E, it is judged as a warning mode. If a concentration of the $NaBO_2$ is more than F, it is judged as a fault mode.

A method for checking replacement time of a filter for filtering $NaBO_2$ is the same as said method for checking replacement time of a fuel according to $NaBO_2$. A sensing unit for measuring a concentration of $NaBO_2$ is preferably positioned near the $NaBO_2$ filter.

INDUSTRIAL APPLICABILITY

As aforementioned, in the fuel cell system of the present invention, replacement time of a used fuel and a filter for filtering impurity is notified to a user by detecting a consumption degree of a fuel and a generation degree of impurity. According to this, a fuel usage is maximized, and a misoperation of the system that can be generated due to a fuel deficiency or excessive impurities is prevented. Also, since replacement time of a fuel and a filter is notified to the user, the system can be stably operated.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A fuel cell system comprising:
a fuel cell stack that includes a plurality of fuel cells, each fuel cell having an anode and a cathode arranged under a state that an electrolyte membrane is positioned therebetween;
a fuel tank for storing a fuel;
a fuel circulation supply means for circulation-supplying a fuel stored in the fuel tank to the anode of the fuel cell stack;
an air supply unit connected to the cathode of the fuel cell stack by an air supply line, for supplying oxygen to the cathode;
a sensing unit for measuring a concentration of at least one of fuels supplied to the anode; and
a control unit for receiving a signal of the sensing unit and informing replacement time of a fuel, that is stored in the fuel tank,
wherein the fuel circulation supply means includes:
a pump arranged between the fuel tank and the fuel cell stack, for pumping a fuel,
a gas/liquid separator for separating a fuel, air, and a byproduct remaining at the fuel cell stack after a reaction into gas and liquid,
a fuel returning line for returning liquid separated by the gas/liquid separator to the fuel tank, and
a recycle pump arranged on the fuel returning line, for pumping liquid separated by the gas/liquid separator.

2. The system of claim 1, wherein the air supply unit includes:
an air compressor for supplying air in the atmosphere to the cathode of the fuel cell stack; and
an air filter for filtering air supplied to the fuel cell stack.

3. The system of claim 2, wherein the air supply unit further includes:
a humidifier for humidifying air supplied to the fuel cell stack; and
a water tank for supplying moisture to the humidifier.

4. The system of claim 1, wherein the sensing unit is arranged at the fuel tank.

5. The system of claim 1, wherein the sensing unit is arranged at the fuel circulation supply means.

6. The system of claim 1, wherein a fuel supplied to the fuel tank includes $NaBH_4$ and NaOH.

7. The system of claim 1, wherein the fuel circulation supply means is provided with a filter for filtering a part of a byproduct generated after a reaction,
wherein the filter is a $NaBO_2$ filter for filtering $NaBO_2$.

8. The system of claim 1, further comprising another sensing unit for measuring an amount of $NaBO_2$.

9. A fuel cell system comprising:
a fuel cell stack that includes a plurality of fuel cells, each fuel cell having an anode and a cathode arranged under a state that an electrolyte membrane is positioned therebetween;
a fuel tank for storing a fuel;
a fuel circulation supply means for circulation-supplying a fuel stored in the fuel tank to the anode of the fuel cell stack;
an air supply unit connected to the cathode of the fuel cell stack by an air supply line, for supplying oxygen to the cathode;
a sensing unit for measuring a concentration of at least one of fuels supplied to the anode; and
a control unit for receiving a signal of the sensing unit and informing replacement time of a fuel that is stored in the fuel tank,
wherein a fuel supplied to the fuel tank includes $NaBH_4$ and NaOH.

10. The system of claim 9, wherein the fuel circulation supply means includes:
a pump arranged between the fuel tank and the fuel cell stack, for pumping a fuel;
a gas/liquid separator for separating a fuel, air, and a byproduct remaining at the fuel cell stack after a reaction into gas and liquid;
a fuel returning line for returning liquid separated by the gas/liquid separator to the fuel tank; and
a recycle pump arranged on the fuel returning line, for pumping liquid separated by the gas/liquid separator.

11. The system of claim 9, wherein the air supply unit includes:
an air compressor for supplying air in the atmosphere to the cathode of the fuel cell stack;
an air filter for filtering air supplied to the fuel cell stack;
a humidifier for humidifying air supplied to the fuel cell stack; and
a water tank for supplying moisture to the humidifier.

12. A fuel cell system comprising:
a fuel cell stack that includes a plurality of fuel cells, each fuel cell having an anode and a cathode arranged under a state that an electrolyte membrane is positioned therebetween;
a fuel tank for storing a fuel;
a fuel circulation supply means for circulation-supplying a fuel stored in the fuel tank to the anode of the fuel cell stack;
an air supply unit connected to the cathode of the fuel cell stack by an air supply line, for supplying oxygen to the cathode;
a first sensing unit for measuring a concentration of at least one of fuels supplied to the anode; and
a control unit for receiving a signal of the first sensing unit and informing replacement time of a fuel that is stored in the fuel tank,
wherein the fuel circulation supply means includes:
a filter for filtering a art of a byproduct generated after a reaction and
a second sensing unit for measuring an amount of $NaBO_2$,
wherein the filter is a $NaBO_2$ filter for filtering $NaBO_2$.

13. The system of claim 12, wherein the second sensing unit is arranged at the fuel tank.

14. The system of claim 12, wherein the second sensing unit is arranged at the fuel circulation supply means.

15. The system of claim 12, wherein the fuel circulation supply means includes:
a pump arranged between the fuel tank and the fuel cell stack, for pumping a fuel;
a gas/liquid separator for separating a fuel, air, and a byproduct remaining at the fuel cell stack after a reaction into gas and liquid;
a fuel returning line for returning liquid separated by the gas/liquid separator to the fuel tank; and
a recycle pump arranged on the fuel returning line, for pumping liquid separated by the gas/liquid separator.

16. The system of claim 12, wherein the air supply unit includes:
an air compressor for supplying air in the atmosphere to the cathode of the fuel cell stack;
an air filter for filtering air supplied to the fuel cell stack;
a humidifier for humidifying air supplied to the fuel cell stack; and
a water tank for supplying moisture to the humidifier.

17. The system of claim 12, wherein a fuel supplied to the fuel tank includes $NaBH_4$ and NaOH.

18. A fuel cell system comprising:
A DBFC for generating a power by receiving $NaBH_4$ and NaOH;
a sensing unit arranged at the DBFC, for measuring a concentration of at least one of $NaBH_4$ and NaOH that are used as a fuel, or $NaBO_2$ that is a product after a reaction; and
a control unit for informing replacement time of a fuel or a $NaBO_2$ filter by receiving a signal of the sensing unit.

19. A controlling method of a fuel cell system comprising:
measuring a concentration of at least one fuel;
comparing the measured concentration with a preset value; and
informing replacement time of a fuel according to a result obtained by the comparing,
wherein the fuel includes $NaBH_4$ and NaOH.

20. The method of claim 19, wherein informing the replacement time includes notifying a fuel replacement when a concentration of $NaBH_4$ is less than a first preset value.

21. The method of claim 20, further comprising stopping the fuel cell system when a concentration of $NaBH_4$ is less than a second preset value that is less than the first preset value.

22. The method of claim 19, wherein informing the replacement time includes notifying a fuel replacement when a concentration of NaOH is less than a third preset value.

23. The method of claim 22 further comprising stopping the fuel cell system when a concentration of NaOH is less than a fourth preset value that is less than the third preset value.

24. The method of claim 19, wherein measuring the concentration includes measuring an amount of $NaBO_2$.

25. The method of claim 24, wherein informing the replacement time includes notifying a fuel replacement when a concentration of $NaBO_2$ is more than a fifth preset value.

26. The method of claim 25 further comprising stopping the fuel cell system when a concentration of $NaBO_2$ is more than a sixth preset value that is more than the fifth preset value.

27. The method of claim 24 further comprising informing replacement time of a filter for filtering $NaBO_2$ when an amount of $NaBO_2$ is detected to be more than a seventh preset value.

28. A controlling method of a fuel cell system comprising:
measuring a concentration of at least one of NaOH and $NaBH_4$ that are used as a fuel, and $NaBO_2$ that is a byproduct;
comparing a measured concentration value with a preset value;
informing input time of a fuel or replacement time of a filter according to a result of the comparing.

* * * * *